Nov. 29, 1955 P. W. MAURER ET AL 2,725,257
WHEEL COVERS
Filed May 22, 1952 2 Sheets-Sheet 1

Inventors
Philip W. Maurer &
William J. Tell
By Willits, Helwig & Gaillio
Attorneys

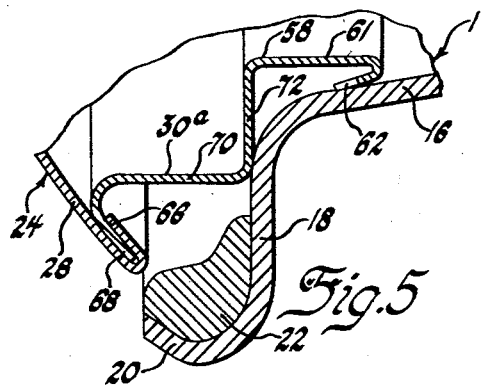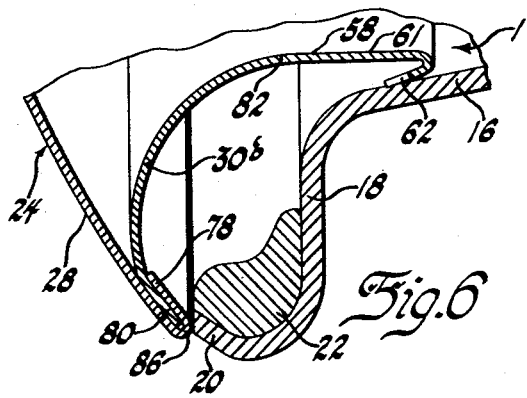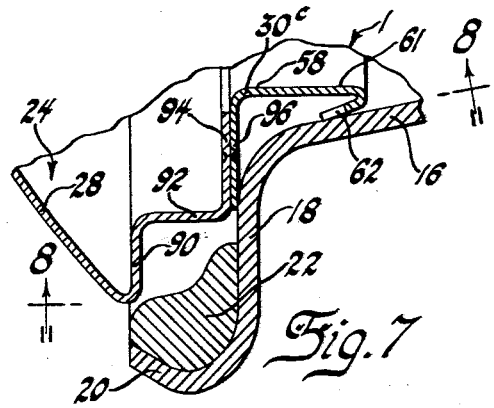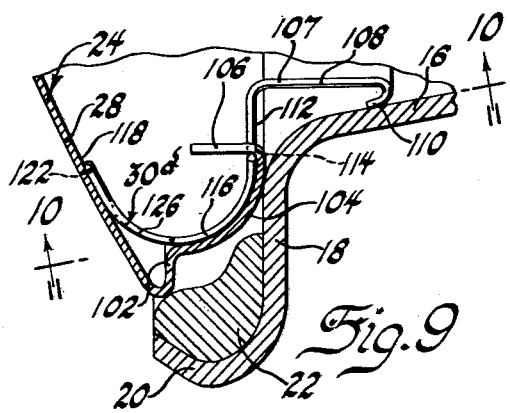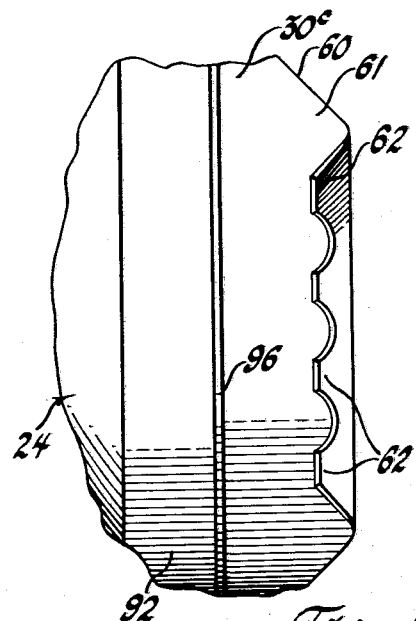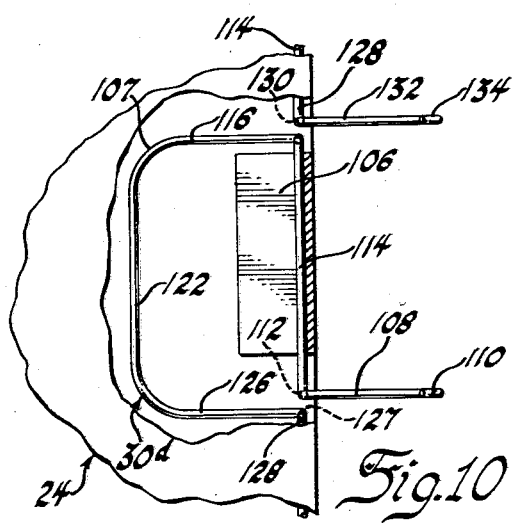

United States Patent Office 2,725,257
Patented Nov. 29, 1955

2,725,257

WHEEL COVERS

Philip W. Maurer, Dearborn, and William J. Tell, Holly, Mich., assignors to General Motors Corporation, Detroit, Mich., a corporation of Delaware Application May 22, 1952, Serial No. 289,278

11 Claims. (Cl. 301—37)

This invention relates to wheel covers, hub caps, and the like employed particularly on the wheels of automotive vehicles.

One object of the present invention is to provide a cover for a flange type wheel which covers substantially the entire side of the wheel and yet is so disposed with respect to the outer periphery thereof as to permit the installation of balancing weights on the wheel rim.

Another object is to provide a fabricated wheel cover which is sturdy and of durable construction.

A further object is to provide in a wheel cover of the stated character air openings through which air may circulate to cool the wheel brakes and other parts of the wheel.

A still further object is to provide a wheel cover which may be readily assembled in proper position on the wheel of a vehicle.

A still further object is to provide a wheel cover which is simple in construction and economic in manufacture.

Other and further objects will become apparent as the description of the invention progresses.

Of the drawings:

Fig. 5 is a view similar to Fig. 4 showing a modified construction.

Fig. 6 is a view similar to Figs. 4 and 5 but showing a still further modification.

Fig. 7 is a view similar to Figs. 4 to 6 showing a still further modification of the invention.

Fig. 8 is a fragmentary view showing the structure of the means for securing the cover to the wheel, said view being taken substantially along line 8—8 of Fig. 7.

Fig. 9 is a view similar to Figs. 4 to 7 showing a still further modification, and Fig. 10 is a fragmentary view, partly in section, taken substantially along line 10—10 of Fig. 9.

Figure 1:
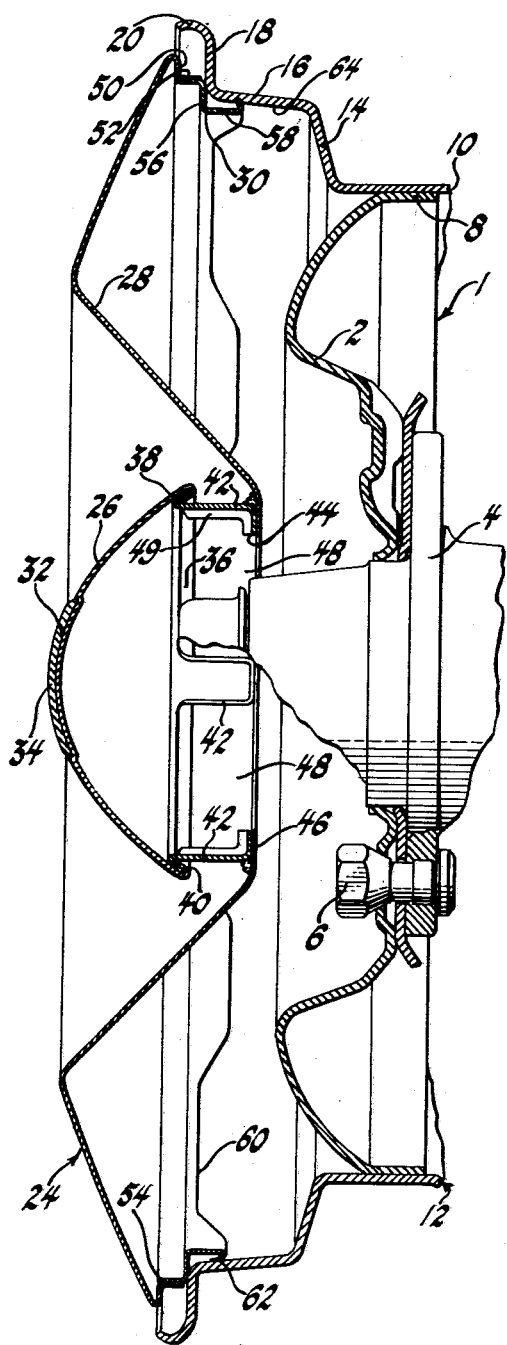
Fig. 1 is a sectional elevational view taken through a vehicle wheel showing a wheel cover mounted thereon.
Figure 2:
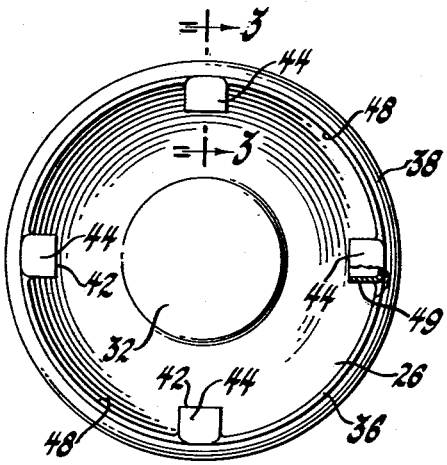
Fig. 2 is an elevational view of the central portion of the wheel cover looking in the direction of the inner side thereof.

Referring to the drawings, the numeral 1 designates generally a pressed metal type of vehicle wheel of the drop center type, comprising a dished body or central portion 2 which may be secured to the hub 4 of the wheel by bolts 6 in the usual fashion. The body portion 2 terminates at the outer periphery thereof in a substantially horizontal flange 8 which is secured by welding or otherwise to the flat central portion 10 of the rim 12 of the wheel. The flat central portion terminates at the ends (only one of which is shown) in an upwardly and outwardly inclined flange 14 which in turn terminates in an outwardly and slightly upwardly inclined flange 16, while the latter terminates in a vertical flange portion 18 terminating at the outer end thereof in a curved lip portion 20. The lip portion 20 forms a seat for wheel balancing weights 22 which may be attached thereto in any suitable manner.

The terms "outer" and "inner" hereinafter used herein designate portions or parts extending, respectively, away and toward wheel 1.

Figure 3:
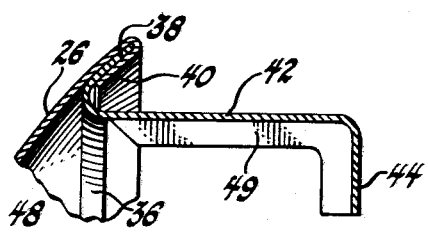
Fig. 3 is a sectional view taken substantially along line 3—3 of Fig. 2.

Secured to the outer portion of wheel 1 and substantially covering the entire side thereof is a wheel cover designated generally by the numeral 24. Cover 24 may be constructed of sheet metal, such for example as stainless steel, and consists of a central convex portion 26, an annular outer portion 28 substantially V-shape in cross section, and an attaching portion 30. Central portion 26 is provided with a recess 32 in the outer end thereof for receiving an ornament 34 which may be secured in said recess by welding or by any other suitable means. Central portion has secured to the inner peripheral end thereof a substantially cylindrical member 36. As shown more particularly in Figs. 1 and 3, the upwardly and inwardly extending peripheral flange 38 of member 36 is secured to convex member 26 by turning the outer edge 40 of the latter over said flange and tightly pressing the parts in position. Member 36 has extending inwardly thereof a plurality of spaced fingers or arms 42 which terminate at their inner ends in vertical flange portions 44, which may be secured to the annular surface 46 of annular member 28 by welding or by any other suitable means. The arms 42 define a series of openings 48 in cylindrical member 36 through which air may be drawn for cooling wheel brakes or other parts associated with the wheel. Each of the arms 42 also has integral therewith a vertically disposed flange 49 extending lengthwise thereof. In cases in which ventilation of the wheel parts is unnecessary the spaced fingers may be eliminated and instead a cylindrical flange may be provided which in turn may be secured to annular member 28. In some cases convex portion 26 and annular portion 28 may also be integral.

The outer peripheral portion of annular member 28 is bent downwardly forming a vertical flange 50 which in turn terminates in a substantially inwardly extending horizontal spacing flange 52.

Figure 4:
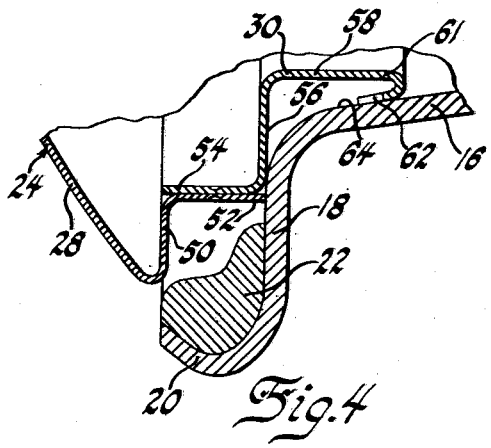
Fig. 4 is a sectional view of the outer rim portion of the wheel cover showing the preferred means for attaching the cover on the flange of the wheel.

The cover attaching portion 30 comprises an annular flange portion 54 which telescopically receives the horizontal flange 52 and is adapted to be secured thereto by spot welding or any other suitable means. A substantially vertical flange 56 extends downwardly from the inner edge of flange 54 and terminates at its inner end in a horizontally extending annular flange portion 58. The horizontal flange portion 58 is cut away at spaced points, as shown at 60, thereby forming a series of spring arms 61 around the periphery thereof. The arms 61 terminate at their inner ends in upwardly and outwardly extending groups of teeth 62 which bitingly engage the inner surface 64 of wheel flange 16 when the cover is assembled on the wheel. Fig. 8 shows more clearly the cutaway portions 60, the spring arms 61 and the groups of teeth 62, which structure is common to all of the species shown herein except that of Figs. 9 and 10. When assembled on the wheel, as shown on Figs. 1 and 4, the teeth 62 are flexed inwardly as are also the arms 61 causing the said teeth to be resiliently urged into biting contact with inner surface 64 with wheel rim 16. To assemble the cover 24 on the wheel, it is simply pushed inwardly until the upper end of vertical flange 56 abuts the outer surface of vertical wheel flange 18. Further inward movement of the cover is thus prevented. The teeth 62 by their frictional engagement with inner surface 64 of wheel flange 16 effectively retain the cover securely on the wheel. In order to remove the cover 24, a tool is inserted between the outer lip 20 of wheel 1 and the peripheral wheel flange 50 and the said cover is then pried off the wheel.

It will be observed that by virtue of spacing flange 52 the vertical flange 50 is spaced from vertical wheel flange 18 thereby providing a space for the addition of balancing weights 22. The cover 24 conceals substantially the entire surface of the wheel 1 including at least a portion of the weights 22 and therefore not only shields the wheel from foreign matter but greatly enhances the appearance of the wheel as a whole.

Fig. 5 shows a modification of the means for attaching the cover 24 to the wheel. As shown in Fig. 5, the peripheral edge 66 of annular member 28 of cover 24 is turned over an inwardly and vertically inclining flange 68 of the attaching member 30a. Flange 68 terminates in an inwardly extending substantially horizontal annular spacing flange 70 which in turn terminates in a vertical flange 72, which in assembly abuts the outer surface of vertical flange 18 of wheel 1. Flange 72 terminates in an inwardly extending substantially horizontal flange portion 58 having inwardly extending spring arms 61 which as in the structure shown in Fig. 4 terminate in outwardly and upwardly extending toothed portions 62. The teeth 62 bitingly engage the inner surface of wheel flange 16 to secure the cover 24 in position on wheel.

Fig. 6 shows a still further modification of the means for securing the wheel cover 24 to vehicle wheel 1. In this construction the outer peripheral edge 78 of the annular portion 28 of wheel cover 24 is turned over and crimped against the peripheral flange 80 provided on a retaining member 30b. Retaining member 30b is bent downwardly and inwardly, as shown at 82, and terminates at its inner end in an annular flange 58 having spring arms 61 extending therefrom which in turn have formed at the inner ends thereof toothed portions 62 of the type shown in Fig. 8. The teeth 62 bitingly engage the inner surface of flange 16 of wheel 1 as is done in the previously described structures. As shown in Fig. 6, the outer periphery 86 of cover 24 lies in substantially abutting relation with the peripheral lip 20 of wheel 1. This abutting relation between the cover 24 and portion 20 limits the inward movement of the cover during the assembly thereof on wheel 1. In this case as in the structures shown in Figs. 4 and 5, a space is provided between cover 24 and wheel flange 18 to accommodate wheel balancing weights 22.

Fig. 7 shows a still further modification wherein the outer periphery of the annular portion 28 of wheel cover 24 is bent downwardly to form a vertical flange, as shown at 90. The vertical flange 90 terminates in an inwardly, horizontally extending flange 92 which in turn terminates in a second vertical flange 94. Flange portion 94 is secured by welding or other means to the vertical flange 96 provided on a cover attaching ring member 30c. Flange 96 of member 30c terminates in an inwardly, horizontally extending flange 58 having spring arms 61 extending inwardly thereof which in turn terminate in tooth portions 62, as shown in Fig. 8. The teeth 62 bitingly engage the inner surface of wheel flange 16 as in the previously described structures when the cover 24 is mounted on the wheel. In this case, the upper edge of flange 96 abuts the outer surface of vertical wheel flange 18 and thereby prevents further inward movement of the cover during assembly thereof on wheel 1.

Figs. 9 and 10 illustrate a still further embodiment of the invention. In this construction instead of providing a cover attaching ring constructed of sheet metal, attaching means 30d constructed of spring wire are mounted on the cover 24. As shown in Figs. 9 and 10, the outer periphery of the annular portion 28 of wheel cover 24 is bent downwardly to form a vertical flange 102 which terminates in an inwardly extending annular arcuate portion 104 which in assembly abuts the outer surface of vertical wheel flange 18. The inner edge of arcuate portion 104 has formed thereon spaced, outwardly extending, substantially horizontally disposed retaining arms 106 for the spring attaching means 30d. Wire attaching means 30d comprises a series of wire clips 107 each of which consists of a substantially horizontal, inwardly extending spring arm portion 108 which terminates at its inner end in an upwardly and outwardly extending tooth portion 110 which is adapted to bitingly engage the inner surface of a wheel flange 16. Spring arm 108 terminates at its outer end in a vertical portion 112 which in turn terminates in a substantially straight transverse portion 114 disposed beneath and in abutting relation with an associated retaining arm 106. Transverse portion 114 terminates in a curved, outwardly extending portion 116 which extends to the inner surface 118 of the annular portion 28 of the cover 24. Curved portion 116 terminates in a straight portion 122 disposed in substantially parallel relation with straight portion 114 which lies in substantially abutting relation with the inner surface 118 of cover 24. Straight portion 122 terminates in an arcuate portion 126 similar to portion 116 which in turn terminates in a vertical portion 127. Vertical portion 127 terminates in a transversely extending portion 128 similar to portion 114 which is disposed beneath and in abutting relation with a second retaining arm 106. Transversely extending portion 128 terminates in a vertical portion 130 similar to portion 112, which in turn terminates in a second inwardly extending spring arm 132. Spring arm 132 like arm 108 terminates at the inner end thereof in an upwardly and outwardly extending tooth 134 which is adapted to bitingly engage the rim 16 of a wheel. The wire clips 107 may be disposed in closely spaced relation around wheel cover 24 or they may be spaced at greater intervals depending upon the size of the wire employed and the degree of firmness to which the cover is desired to be attached to the wheel.

From the foregoing description it is seen that a simplified and highly useful wheel cover has been provided. While several embodiments of the invention have been shown and described herein, it will be apparent to those skilled in the art that other and further embodiments may also be provided without departing from the spirit of the invention. It therefore is to be understood that it is not intended to limit the invention to the embodiments herein specifically disclosed, but only by the scope of the claims which follow.

What is claimed is:

1. A wheel cover comprising, a convex central portion, an annular outer portion substantially V-shape in cross section, a cylindrical portion connecting said convex portion to said outer portion, an annular flange at one end of said cylindrical portion secured to said central portion, a series of circumferentially spaced fingers extending axially from said flange to said outer portion, flange means on each of said fingers, and locking means attached to the said annular portion near the peripheral edge thereof adapted to engage the flange of a wheel at spaced points thereon to removably attach said cover to said wheel.

2. A fabricated sheet metal wheel cover comprising, a convex central portion, an annular outer portion, a circular portion disposed between said central portion and said annular portion, an outwardly extending flange on said circular portion, means on said central portion lockingly engaging said flange, spaced fingers extending inwardly from said flange defining a series of openings through which air may pass, means for securing the inner ends of said fingers to said annular portion, and means secured to the annular portion near the outer periphery thereof for removably attaching said cover to a wheel.

3. In a wheel structure having a drop center rim including outer substantially horizontal and vertical flanges and a body member secured to said rim, a wheel cover comprising, a central portion, an annular outer portion, means connecting said central portion to said annular portion, an axially inwardly extending annular flange formed near the outer periphery of said annular portion, an axially inwardly extending annular locking member, an annular flange on said locking member telescopingly engaging said first mentioned annular flange and secured thereto, a vertical flange formed intermediately of said locking member adapted to engage the said outer vertical flange of said wheel rim, an axially inwardly extending flange formed on said vertical flange of said locking member having spaced inwardly projecting arm portions thereon, and upwardly and outwardly inclining means formed at the inner ends of said arm portions adapted to engage said outer horizontal wheel flange to secure the cover in position on said wheel.

4. In a wheel structure having a drop center rim including outer substantially horizontal and vertical flanges and a body member secured to said rim, a wheel cover comprising, a central portion, an annular outer portion, means connecting said central portion to said annular portion, an axially inwardly extending annular flange formed near the outer periphery of said annular portion, an axially inwardly extending annular locking member, an axially outwardly extending annular flange on said locking member telescopingly engaging said first mentioned annular flange and secured thereto, an intermediate flange formed on said axially extending flange adapted to engage the said outer vertical flange of said wheel rim, an axially inwardly extending flange on said locking member having spaced inwardly projecting arm portions thereon, and radially and axially outwardly inclining teeth means formed at the inner ends of said arm portions adapted to engage the said outer horizontal flange of said rim to secure the cover on said wheel.

5. In a wheel structure having a drop center rim including an outer substantially horizontal flange and an outer substantially vertical flange and a body member secured to said rim, a circular cover adapted for mounting at the outer side of said wheel comprising, a circular central portion, an annular outer portion, means connecting said central portion to said annular portion, an annular locking member comprising a cylindrical portion, an inclined flange formed at the outer edge of said cylindrical portion, means on said annular portion for lockingly engaging said flange, a vertical flange formed at the inner edge of said cylindrical portion adapted to engage said outer vertical wheel flange to limit the inward movement of said cover on said wheel, a substantially horizontally disposed flange formed on and extending inwardly of said vertical flange on said cylindrical portion, and locking means formed on said last mentioned flange adapted to engage said outer horizontal wheel flange to secure the cover in position on said wheel.

6. In a wheel structure having a drop center rim including an outer substantially horizontal flange and an outer substantially vertical flange and a body member secured to said rim, a circular cover adapted for mounting at the outer side of said wheel comprising, a circular central portion, an annular outer portion, means connecting said central portion to said annular portion, the peripheral edge of said annular portion being bent downwardly to form a vertical flange then inward to form a substantially horizontally disposed spacing flange and thence downwardly to form a second vertical flange, an annular locking member, a vertical flange on said locking member engaging said second vertical flange and secured to the latter, said last mentioned flange being adapted to engage the said outer vertical wheel flange to limit movement of said cover on said wheel, an inwardly extending flange formed on said locking member, and means projecting from said inwardly extending flange adapted to engage the said outer horizontal wheel flange to secure said cover on said wheel.

7. In a wheel structure having a drop center rim including an outer substantially horizontal flange and an outer substantially vertical flange and a body member secured to said rim, a circular cover adapted for mounting at the outer side of said wheel comprising, a circular central portion, an annular outer portion, means connecting said central portion to said annular portion, the peripheral edge of said annular portion being bent downwardly to form a vertical flange and then inward to form an inwardly extending flange of substantially arcuate cross section, and spring wire locking means carried by said annular portion for attaching said cover to said wheel.

8. In a wheel structure having a drop center rim including an outer substantially horizontal flange and an outer substantially vertical flange and a body member secured to said rim, a circular cover adapted for mounting at the outer side of said wheel comprising, a circular central portion, an annular outer portion, means connecting said central portion to said annular portion, the peripheral edge of said annular portion being bent downwardly to form a vertical flange and then inward to form an inwardly extending flange of substantially arcuate cross section, spring wire locking means carried by said annular portion for attaching said cover to said wheel, said wire locking means comprising a series of spaced inwardly extending arms, means formed at the inner end of each of said arms adapted to bitingly engage the said outer substantially horizontal wheel flange to secure the cover in position thereon, and retaining means on said inwardly extending flange for retaining said wire locking means in position on said annular portion.

9. In a wheel structure having a drop center rim including an outer substantially horizontal flange and an outer substantially vertical flange and a body member secured to said rim, a circular cover adapted for mounting at the outer side of said wheel comprising, a circular central portion, an annular outer portion, means connecting said central portion to said annular portion, the peripheral edge of said annular portion being bent downwardly to form a vertical flange and then inward to form an inwardly extending flange of substantially arcuate cross section, spring wire locking means carried by said annular portion for attaching said cover to said wheel, said spring wire locking means comprising, a series of spring clips mounted around the periphery of said annular portion, each of said clips comprising a pair of spaced spring arms extending inwardly of said cover, means on the inner ends of said arms for engaging the said outer horizontal wheel flange, and retaining arms extending outwardly of the inner edge of said inwardly extending flange for retaining said clips in position on said cover.

10. A wheel cover comprising, a central convex portion, an annular outer portion, a cylindrical portion disposed between said central portion and said annular portion, an annular inclined flange at one end of said cylindrical portion, means on said central portion lockingly engaging said flange, means for securing the other end of said cylindrical portion to said annular outer portion, and means carried by said annular portion adapted to engage a substantially horizontal flange on a wheel for attaching said cover to the latter.

11. A wheel cover comprising, a central convex portion, an outer annular portion, a circular member disposed radially and axially inwardly of the periphery of said central portion and extending between the latter and said annular portion, means for securing said circular member to said central portion, a series of spaced arms on said circular member extending toward said annular portion defining openings through which air may pass, means for securing said arms to said annular portion, and means carried by said annular portion for removably securing said wheel cover to the flange of a wheel.

References Cited in the file of this patent

UNITED STATES PATENTS

| | | |
|---|---|---|
| 1,665,437 | Booth | Apr. 10, 1928 |
| 2,129,115 | Best | Sept. 6, 1938 |
| 2,351,655 | Aske | June 20, 1944 |
| 2,624,639 | Lyon | Jan. 6, 1953 |
| 2,633,944 | Butterfield | Apr. 7, 1953 |